United States Patent
Keoshkerian et al.

(10) Patent No.: US 10,814,659 B2
(45) Date of Patent: Oct. 27, 2020

(54) METHODS FOR PRINTING CONDUCTIVE OBJECTS

(71) Applicant: Xerox Corporation, Norwalk, CT (US)

(72) Inventors: Barkev Keoshkerian, Thornhill (CA); Adela Goredema, Ancaster (CA); Sarah J. Vella, Milton (CA); Biby Esther Abraham, Mississauga (CA); Michelle N Chretien, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 275 days.

(21) Appl. No.: 16/021,367

(22) Filed: Jun. 28, 2018

(65) Prior Publication Data

US 2020/0001637 A1 Jan. 2, 2020

(51) Int. Cl.
| | |
|---|---|
| *B33Y 10/00* | (2015.01) |
| *B41M 3/00* | (2006.01) |
| *B41M 5/00* | (2006.01) |
| *B33Y 30/00* | (2015.01) |
| *B33Y 70/00* | (2020.01) |
| *B28B 1/00* | (2006.01) |

(52) U.S. Cl.
CPC ............. *B41M 3/006* (2013.01); *B28B 1/001* (2013.01); *B33Y 10/00* (2014.12); *B33Y 30/00* (2014.12); *B33Y 70/00* (2014.12); *B41M 5/0023* (2013.01)

(58) Field of Classification Search
CPC ...................................................... B28B 1/001
See application file for complete search history.

(56) References Cited

U.S. PATENT DOCUMENTS

| | | |
|---|---|---|
| 7,270,694 B2 | 9/2007 | Li et al. |
| 7,699,918 B2 | 4/2010 | Odell |
| (Continued) | | |

FOREIGN PATENT DOCUMENTS

| | | |
|---|---|---|
| EP | 2123723 A1 | 11/2009 |
| EP | 3354629 | 8/2018 |
| (Continued) | | |

OTHER PUBLICATIONS

Extended European Search Report issued in European Application No. 18187161.7-1102, dated Jan. 7, 2019, 6 pages.

(Continued)

*Primary Examiner* — Joseph A Miller, Jr.
(74) *Attorney, Agent, or Firm* — Bell & Manning, LLC

(57) ABSTRACT

Methods for printing a conductive object are provided which may comprise dispensing one of a first ink composition and a second ink composition towards a substrate surface to form a deposition region on the substrate surface or on a previously printed object on the substrate surface, wherein the first ink composition comprises an aqueous solution of a metal compound and the second ink composition comprises an aqueous solution of a stable free radical; dispensing the other of the first and second ink compositions in the deposition region to mix the first and second ink compositions and induce chemical reduction of the metal compound by the stable free radical and precipitation of the metal of the metal compound; and removing solvent from the deposition region, thereby forming a conductive object comprising the precipitated metal.

18 Claims, 1 Drawing Sheet

(56) References Cited

U.S. PATENT DOCUMENTS

| | | |
|---|---|---|
| 8,414,982 B2 | 4/2013 | Hayoz et al. |
| 8,765,025 B2 | 7/2014 | Wu et al. |
| 9,486,996 B2 | 8/2016 | Ng et al. |
| 9,725,614 B2 | 8/2017 | Liu et al. |
| 9,752,040 B2 | 9/2017 | Goredema et al. |
| 2006/0073667 A1* | 4/2006 | Li .................. H01L 51/105 438/311 |
| 2007/0261595 A1 | 11/2007 | Johnson et al. |
| 2008/0206488 A1 | 8/2008 | Chung et al. |
| 2014/0174801 A1 | 6/2014 | Wei et al. |
| 2015/0004325 A1 | 1/2015 | Walker et al. |
| 2015/0037550 A1 | 2/2015 | Balasubramaniam et al. |
| 2015/0240101 A1 | 8/2015 | Chopra et al. |
| 2016/0057866 A1 | 2/2016 | Shimoda et al. |
| 2016/0130700 A1 | 5/2016 | Nishimura et al. |
| 2017/0240758 A1 | 8/2017 | Liu et al. |
| 2017/0253757 A1 | 9/2017 | Salami et al. |
| 2018/0118967 A1 | 5/2018 | Liu et al. |
| 2018/0312710 A1 | 11/2018 | Vaseem |
| 2019/0062582 A1 | 2/2019 | Keoshkerian et al. |
| 2019/0085195 A1 | 3/2019 | Keoshkerian et al. |

FOREIGN PATENT DOCUMENTS

| | | |
|---|---|---|
| WO | WO 2013/0365191 A1 | 3/2013 |
| WO | WO2013/175965 A1 | 11/2013 |
| WO | WO2015/010198 A1 | 1/2015 |

OTHER PUBLICATIONS

Extended European Search Report issued in European Application No. 18194632.8-1102, dated Nov. 30, 2018, 6 pages.

* cited by examiner

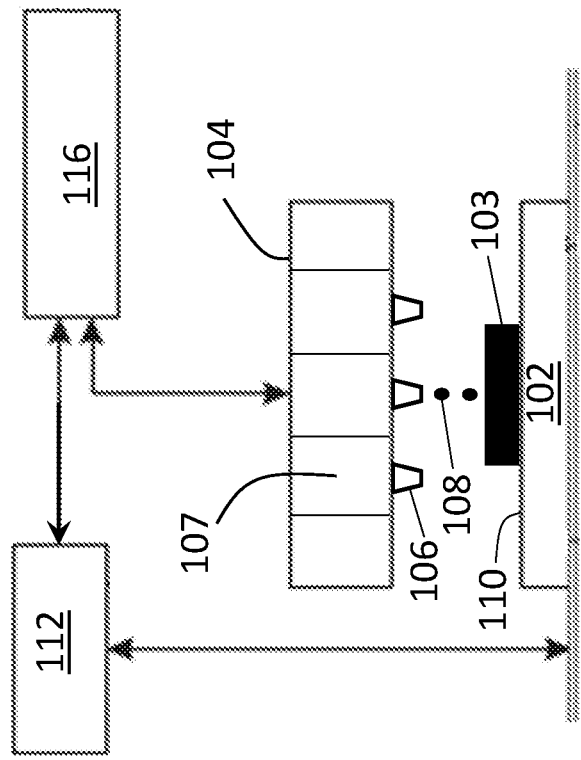

METHODS FOR PRINTING CONDUCTIVE OBJECTS

BACKGROUND

There are three basic methods for printing conductive patterns. One method is to print metallic flakes followed by sintering. A second method is to prepare stabilized metallic nanoparticles and subsequently print them followed by sintering. This method allows sintering at lower temperatures than the bulk metal requires. A third method is to print organometallic complexes that are then converted to the metal on the substrate by heat and chemical means. For each of these categories, there can be drawbacks in the stability of the necessary compositions, ease of preparation, and post printing requirements. Metallic flakes can be difficult to print via inkjet printing. Nanoparticle inks can be difficult to prepare and keep stable. Even small increases in the size of the nanoparticles, for example, from 5 nm to 10 nm in average particle diameter, can result in a 30° C. change in sintering temperatures. Organometallic complex precursors offer flexibility in terms of printing latitude but can be difficult to prepare and handle and can be cost prohibitive.

SUMMARY

Provided are methods for printing conductive objects. Printing systems and related components used to carry out the methods are also provided. As compared to conventional methods of printing conductive objects, at least some embodiments of the present methods are simpler, cheaper (e.g., making using of aqueous solutions and readily available ingredients) and more flexible (e.g., making use of room temperature conditions, thereby allowing for a greater range of substrate surfaces and processing environments.)

In one aspect, methods for printing a conductive object are provided. In an embodiment, such a method comprises dispensing one of a first ink composition and a second ink composition towards a substrate surface to form a deposition region on the substrate surface or on a previously printed object on the substrate surface, wherein the first ink composition comprises an aqueous solution of a metal compound and the second ink composition comprises an aqueous solution of a stable free radical; dispensing the other of the first and second ink compositions in the deposition region to mix the first and second ink compositions and induce chemical reduction of the metal compound by the stable free radical and precipitation of the metal of the metal compound; and removing solvent from the deposition region, thereby forming a conductive object comprising the precipitated metal.

In another embodiment, a method for printing a conductive object comprises dispensing one of a first ink composition and a second ink composition towards a substrate surface to form a deposition region on the substrate surface or on a previously printed object on the substrate surface, wherein the first ink composition comprises an aqueous solution of a silver compound and the second ink composition comprises an aqueous solution of a stable free radical; dispensing the other of the first and second in composition in the deposition region to mix the first and second ink compositions and induce chemical reduction of the silver compound by the stable free radical and precipitation of the silver of the silver compound; and removing solvent from the deposition region, thereby forming a conductive object comprising the precipitated silver, wherein (a) and (b) occur at a dispensing temperature of room temperature.

In another aspect, print heads for inkjet printing are provided. In an embodiment, such a print head comprises a first reservoir comprising a first ink composition comprising an aqueous solution of a metal compound, the print head further comprising a second, separate reservoir comprising a second ink composition comprising an aqueous solution of a stable free radical, wherein the metal compound and the stable free radical are selected such that the stable free radical induces a chemical reduction of the metal compound to form a precipitate comprising the metal of the metal compound upon mixing of the first and second ink compositions.

These and other aspects will be discussed in greater detail below.

BRIEF DESCRIPTION OF THE DRAWINGS

Illustrative embodiments will hereafter be described with reference to the accompanying drawings.

FIG. 1 is a schematic of a portion of a printing system which may be used to carry out embodiments of the present methods.

DETAILED DESCRIPTION

Provided are methods for printing conductive objects. Printing systems and related components used to carry out the methods are also provided.

In one aspect, methods for printing conductive objects on a substrate surface are provided. In an embodiment, such a method comprises dispensing one of a first ink composition and a second ink composition towards a substrate surface to form a deposition region thereover, i.e., a discrete region containing deposited material. The first ink composition comprises an aqueous solution of a metal compound and the second ink composition comprises an aqueous solution of a stable free radical compound. The deposition region may be formed directly on the substrate surface, or, if an object has already been printed onto the substrate surface, the deposition region may be formed directly on the previously printed object. The deposition region may be characterized by a shape and dimensions, although the exact shape/dimensions are not particularly limited. Instead, the shape/dimensions depend upon the compositions of the first and second ink compositions (e.g., viscosity), the characteristics of the printing system (e.g., nozzle geometry of an inkjet printing system) used to carry out the method, as well as the desired conductive object to be printed. However, the deposition region generally has dimensions which are smaller than the substrate supporting the finished conductive object. In the present methods, dispensing the first and second ink compositions does not encompass immersing the substrate surface into the first and second ink compositions.

Next, the method comprises dispensing the other of the first ink composition and the second ink composition into the deposition region. The dispensing of the first and second ink compositions into the same deposition region results in the mixing of the components of the first and second ink compositions. This, in turn, induces a chemical reduction of the metal compound of the first ink composition by the stable free radical compound of the second ink composition. This chemical reduction results in the precipitation of the metal from the metal compound from the mixture within the deposition region to form a solid, conductive metal structure. The dispensing of the first and second ink compositions can be sequential, e.g., dispense the first ink composition and subsequently dispense the second ink composition.

However, the first and second ink compositions can also be dispensed simultaneously, provided that the mixing and chemical reduction takes place on the substrate surface (or the surface of the previously printed object). If the dispensing is sequential, the subsequent dispensing step may occur prior to any drying of the previously dispensed ink composition (although a small amount of evaporation of solvent may occur).

The present methods do not require the use of high temperatures to form conductive objects, e.g., temperatures required to remove solvent from metal flake inks or sinter metal nanoparticles or temperatures required to decompose certain organometallic complexes. Instead, in the present methods, the dispensing steps (dispensing of both the first and second ink compositions) may be carried out at significantly lower temperatures. The temperature at which dispensing occurs may be referred to as a dispensing temperature. The phrase "dispensing temperature" refers to the temperature under which the contact of the ink compositions with the underlying surfaces occurs, the temperature under which the mixing the ink compositions at the underlying surfaces occurs, as well as the temperature under which the chemical reduction reactions at the underlying surfaces occur. In embodiments, the dispensing temperature is less than 60° C., less than 40° C., less than 35° C., less than 30° C., less than 25° C., or in a range of from 20° C. to 40° C. In embodiments, the dispensing temperature is room temperature, i.e., from 20° C. to 25° C.

Next, the method comprises removing solvent from the deposition region containing the mixture of the first and second ink compositions. The result is a dry, solid, conductive structure comprising the metal of the metal compound formed on the substrate surface (or on the previously printed object as noted above). This dry, solid, conductive structure may be the final, desired conductive object or it may be a portion of a larger, conductive object to be formed in which case the steps of the method may be repeated in order to form other portions of the desired object. Solvent removal from the deposition region may be accomplished via evaporation, e.g., evaporation at room temperature or at an elevated temperature, e.g., in a range of from 50° C. to 150° C., from 75° C. to 135° C., or from 120° C. to 130° C. The time/temperature to remove residual solvent is significantly lower than that required to sinter silver.

As noted above, the first ink composition comprises an aqueous solution of a metal compound. The phrase "aqueous solution" encompasses use of only water as a solvent to dissolve the metal compound to provide the first ink composition, as well as the use of water as one of the solvents and an amount of one or more water-miscible organic co-solvents to dissolve the metal compound. Illustrative water-miscible organic co-solvents include butanols, acetaldehyde, acetone, acetonitrile, 1,2-Butanediol, 1,3-Butanediol, 1,4-Butanediol, 2-Butoxyethanol, diethanolamine, diethylenetriamine, dimethylformamide, dimethoxyethane, dimethyl sulfoxide, 1,4-Dioxane, ethanol, ethylamine, ethylene glycol, formic acid, furfuryl alcohol, glycerol, methanol, methyl diethanolamine, 1-Propanol, 1,3-Propanediol, 1,5-Pentanediol, 2-Propanol, propylene glycol, pyridine, tetrahydrofuran, triethylene glycol, tetrahydrofuran, and combinations thereof.

A variety of metal compounds may be used. However, the metal compound is one which is capable of being dissolved in the aqueous solution at the selected dispensing temperature to form metal cations and counter anions therein. The metal compound is also one which is capable of being chemically reduced by the stable free radical of the second ink composition at the selected dispensing temperature to precipitate out of the mixture and form a solid, conductive structure. Thus, suitable metal compounds may be selected on the basis of their solubility in water at room temperature as well as the conductivity of the metal of the metal compound at room temperature. In embodiments, the metal compound has a solubility in water (or water and the selected cosolvents) at room temperature of at least 0.1 Molality, at least 1 Molality, or at least 4 Molality. In embodiments, the metal of the metal compound is characterized by a conductivity at room temperature of at least $1 \times 10^4$ S/m, at least $1 \times 10^5$ S/m, or at least $1 \times 10^7$ S/m.

Illustrative metal compounds include metal benzoates, metal halides, metal carbonates, metal citrates, metal iodates, metal nitrites, metal nitrates, metal acetates, metal phosphates, metal sulfates, metal sulfides, and metal trifluoroacetates. The metal of any of these compounds may be cobalt, silver, copper, nickel, gold, or palladium. Combinations of different types of metal compounds may be used. In embodiments, the metal compound is a silver compound. In embodiments, the silver compound is a silver halide, e.g., AgF. In embodiments, combinations of different types of metal compounds are not used; i.e., only a single type of metal compound, e.g., a silver compound, is used in the method to provide a conductive object comprising a single type of metal, e.g., silver.

Metal compounds which are not generally used in the present methods include metal salt amine complexes such as those as disclosed in U.S. Ser. No. 15/692,201, which is hereby incorporated by reference for its disclosure of metal salt amine complexes. Other metal compounds which are not generally used include those in which the metal and/or compound is in the form of nanoparticles or flakes and certain organometallic complexes which require heat to decompose the organometallic complex, e.g., those in U.S. Pat. No. 9,090,785, which is hereby incorporated by reference for its disclosure of organometallic complexes. Regarding these types of compositions (i.e., those based on nanoparticles, flakes, organometallic complexes), the present ink compositions are distinguished from these, e.g., by being composed of an aqueous solution of the metal compound, i.e., the metal compound is dissolved to form metal cations/counter anions.

Additives may be included in the first ink composition, e.g., additives to tune the properties of the first ink composition to facilitate printing. An illustrative additive is a humectant such as polyvinyl alcohol. An illustrative additive is an alcohol to reduce surface tension. An illustrative additive is a glycol to increase volatility temperature.

As noted above, the second ink composition comprises an aqueous solution of a stable free radical. A variety of stable free radicals may be used. However, the stable free radical is a compound which comprises an unpaired electron so as to induce the reduction of the selected metal compound as described above, but which is otherwise unreactive in its aqueous solution at the selected dispensing temperature until mixing of the first and second ink compositions. Illustrative stable free radicals include nitroxides, hydrazyls and trityl radicals. Illustrative nitroxides include hydroxytempo, tempo, and oxotempo. Combinations of different types of stable free radicals may be used. The phrase "aqueous solution" has a meaning analogous to that described above with respect to the first ink composition. Additives may also be included in the second ink composition to affect ink humectancy, surface tension or volatility as described above.

The metal compound and the stable free radical may each be present in the respective ink compositions at various amounts. Regarding the metal compound, the amount generally depends upon the desired amount of metal on the substrate surface. In embodiments, the metal compound is present in the first ink composition at a concentration in a range of from 0.1 Molality to 4 Molality, from 1 Molality to 4 Molality, or from 0.1 Molality to 2 Molality. Regarding the stable free radical, the amount generally depends upon the selected amount of the metal compound. In embodiments, the concentration of the stable free radical in the second ink composition is selected so as to provide from 0.5 to 1 Molar equivalent to the metal compound in the first ink composition. This includes from 0.7 to 1 Molar equivalent and from 0.5 to 0.8 Molar equivalent. The amount of any additives, if present, in the first and second compositions may be selected depending upon the desired properties of these compositions (e.g., viscosity, adhesion, etc.). In general, to facilitate printing of the first and second ink compositions, e.g., via an inkjet printing system, the surface tension of the compositions is tuned to the selected inkjet system, the humectancy of the compositions is tuned so the compositions are stable at the nozzle(s) of the selected inkjet system, and the volatility of the compositions is tuned such that the compositions do not volatilize at the nozzle(s) but do volatilize at the substrate surface.

Although the present methods can make use of first ink compositions comprising different types of metal compounds and/or sequential use of multiple first ink compositions, each ink composition comprising a different type of metal compound, in such embodiments, the chemical reduction(s) of the metal compound(s) to provide the solid metal(s) is induced by the stable free radical(s) provided by the second ink composition(s). That is, the stable free radical of the second ink composition is used as a source of electrons to reduce the metal compound of the first ink composition and achieve precipitation of the metal from the metal compound to form a solid, conductive metal structure. The present methods do not involve or require catalysis by solid metal formed in a previous set of dispensing steps in order to achieve such precipitation. As such, the present methods are distinguished from the methods disclosed in U.S. Patent Publication No. 20070261595, which is hereby incorporated by reference for this purpose. Similarly, the present methods do not involve the use of silver-catalyzed electroless plating of another metal on previously deposited silver or silver-catalyzed electroplating of another metal on previously deposited silver.

A variety of substrates may be used in the present methods, including fabric, paper, or plastics (e.g., polyester, polycarbonate, polyimide, mylar, polyethylene terephthalate (PET), etc.). Rigid substrates such as silicon and glass may also be used.

The present methods may be carried out using a variety of printing systems. Two-dimensional (2D) printing systems such as inkjet printing systems may be used. Three-dimensional (3D) printing systems configured to carry out various digital additive manufacturing techniques in order to form successive layers of materials(s) under computer control to create a 3D object may also be used. Both 2D inkjet printing systems and 3D printing systems make use of print heads which are configured to contain ink compositions and to dispense the ink compositions through apertures (e.g., nozzles) onto substrate surfaces. A portion of an illustrative printing system 100 is shown schematically in FIG. 1. The printing system 100 includes a printer configured to support/feed a substrate 102. The printer comprises a print head 104 comprising a plurality of nozzles (one of which is labeled 106). The print head 104 is configured to contain ink composition(s) in reservoirs (one of which is labeled 107) and to dispense the ink composition(s) (one of which is labeled 108) towards a surface 110 of the substrate 102 in order to form an object 103 thereon. Different reservoirs/nozzles of the print head 104 may be used to contain/dispense different ink compositions, e.g., one reservoir/nozzle may be used to dispense any of the disclosed first ink compositions and another reservoir/nozzle may be used to dispense any of the disclosed second ink compositions. Alternatively, separate print heads may be used to contain/dispense different ink compositions. The printing system 100 further includes an actuator 112 configured to achieve relative translation of the substrate 102 and the print head 104. The printing system 100 also includes a controller 116 configured to control the operation of the devices (or components thereof) of the printing system 100. The printing system 100 may include other components as is well known and may be configured to achieve 2D or 3D printing as described above.

The present methods may be used to form a variety of conductive 2D and 3D objects. The conductive objects may be used as electrodes, conductive pads, interconnects, lines, traces, tracks, etc. in a variety of electronic devices such as thin film transistors, organic light emitting diodes, RFID tags, photovoltaic devices, displays, printed antenna, etc.

In embodiments, the conductive object printed by the method is an electrode trace having a width (as measured parallel to the substrate surface) in a range of from 0.025 $\mu$m to 10 $\mu$m, from 0.03 $\mu$m to 5 $\mu$m, from 0.04 $\mu$m to 2.5 $\mu$m, or from 0.05 $\mu$m to 1 $\mu$m.

In embodiments, the conductive object printed by the method exhibits a conductivity of at least 100 S/cm, at least 1,000 S/cm, at least 2,000 S/cm, at least 5,000 S/cm, at least 10,000 S/cm, at least 50,000 S/cm, at least 100,000 S/cm, or in the range of from 100 S/cm to 100,000 S/cm.

Example

The following Example is being submitted to illustrate various embodiments of the present disclosure. The Example is intended to be illustrative only and is not intended to limit the scope of the present disclosure. Also, parts and percentages are by weight unless otherwise indicated.

Silver fluoride (0.63 g) was added to 1 g of a polyvinyl alcohol solution (0.172% by weight in water). The aqueous solution was stirred until the silver fluoride was dissolved to provide a first ink composition. Hydroxytempo (HOT, 0.43 g) was added to 0.25 g water and 0.25 g isopropanol. The aqueous solution was stirred until HOT was dissolved to provide a second ink composition.

One droplet of the second ink composition was dispensed onto the surface of a mylar sheet. Next one droplet of the first ink composition was dispensed onto the deposited second ink composition. Silver particles formed immediately upon contact and mixing of the droplets. The coated mylar sheet was placed into an oven at 125° C. for 30 minutes to remove the solvents. The conductive object on the mylar sheet exhibited conductive behavior as the resistance as measured by a two-probe multimeter was 0.4$\Omega$.

It will be appreciated that variants of the above-disclosed and other features and functions or alternatives thereof, may be combined into many other different systems or applications. Various presently unforeseen or unanticipated alternatives, modifications, variations or improvements therein may be subsequently made by those skilled in the art, which are also intended to be encompassed by the following claims.

What is claimed is:

1. A method for printing a conductive object, the method comprising:
   (a) dispensing one of a first ink composition and a second ink composition towards a substrate surface to form a deposition region on the substrate surface or on a previously printed object on the substrate surface, wherein the first ink composition comprises an aqueous solution of a metal compound and the second ink composition comprises an aqueous solution of a stable free radical,
   (b) dispensing the other of the first and second ink compositions in the deposition region to mix the first and second ink compositions and induce chemical reduction of the metal compound by the stable free radical and precipitation of the metal of the metal compound, and
   (c) removing solvent from the deposition region, thereby forming a conductive object comprising the precipitated metal.

2. The method of claim 1, wherein (b) occurs prior to removing solvent from the deposition region containing one of the first and second ink compositions.

3. The method of claim 1, wherein (a) and (b) occur at a dispensing temperature of less than 60° C.

4. The method of claim 3, wherein the dispensing temperature is room temperature.

5. The method of claim 1, wherein the metal compound has a solubility in water at room temperature of at least 0.1 Molality and wherein the metal of the metal compound is characterized by a conductivity at room temperature of at least $1\times10^4$ S/m.

6. The method of claim 5, wherein the metal compound is selected from metal benzoates, metal halides, metal carbonates, metal citrates, metal iodates, metal nitrites, metal nitrates, metal acetates, metal phosphates, metal sulfates, metal sulfides, and metal trifluoroacetates and wherein the metal of the metal compound is selected from cobalt, silver, copper, nickel, gold, and palladium.

7. The method of claim 5, wherein the metal compound is a silver compound.

8. The method of claim 5, wherein the metal compound is a silver halide.

9. The method of claim 1, wherein the stable free radical is selected from nitroxides, hydrazyls, and trityl radicals.

10. The method of claim 1, wherein the stable free radical is selected from hydroxytempo, tempo, and oxotempo.

11. The method of claim 1, wherein the method employs a single type of metal compound to provide the conductive object comprising a single type of metal.

12. The method of claim 11, wherein the metal compound is a silver compound and the single type of metal is silver.

13. The method of claim 1, wherein the method is carried out on an inkjet printing system.

14. A method for printing a conductive object, the method comprising:
   (a) dispensing one of a first ink composition and a second ink composition towards a substrate surface to form a deposition region on the substrate surface or on a previously printed object on the substrate surface, wherein the first ink composition comprises an aqueous solution of a silver compound and the second ink composition comprises an aqueous solution of a stable free radical,
   (b) dispensing the other of the first and second ink composition in the deposition region to mix the first and second ink compositions and induce chemical reduction of the silver compound by the stable free radical and precipitation of the silver of the silver compound, and
   (c) removing solvent from the deposition region, thereby forming a conductive object comprising the precipitated silver, wherein (a) and (b) occur at a dispensing temperature of room temperature.

15. The method of claim 14, wherein the silver compound has a solubility in water at room temperature of at least 0.1 Molality.

16. The method of claim 15, wherein the silver compound is selected from silver benzoates, silver halides, silver carbonates, silver citrates, silver iodates, silver nitrites, silver nitrates, silver acetates, silver phosphates, silver sulfates, silver sulfides, and silver trifluoroacetates.

17. The method of claim 14, wherein the conductive object comprises a single type of metal, the single type of metal being silver.

18. The method of claim 14, wherein the method employs a single type of metal compound, the metal compound being the silver compound, to provide the conductive object comprising silver as a single type of metal.

* * * * *